US008234695B2

(12) United States Patent
Eldridge et al.

(10) Patent No.: US 8,234,695 B2
(45) Date of Patent: Jul. 31, 2012

(54) NETWORK SECURITY MANAGEMENT FOR AMBIGUOUS USER NAMES

(75) Inventors: Alan D. Eldridge, Hollis, NH (US);
Phillipe A. Loher, Lowell, MA (US);
Peter O. Mierswa, Sterling, MA (US);
Steven E. Read, Berlin, MA (US)

(73) Assignee: International Business Machines Corporation, Armonk, NY (US)

( * ) Notice: Subject to any disclaimer, the term of this patent is extended or adjusted under 35 U.S.C. 154(b) by 1141 days.

(21) Appl. No.: 11/962,560

(22) Filed: Dec. 21, 2007

(65) Prior Publication Data

US 2009/0165106 A1 Jun. 25, 2009

(51) Int. Cl.
*G06F 21/00* (2006.01)
(52) U.S. Cl. ....... 726/5; 726/4; 726/7; 726/19; 713/183; 380/255; 709/223; 705/30; 455/411
(58) Field of Classification Search .................. 726/7, 5; 713/183
See application file for complete search history.

(56) References Cited

U.S. PATENT DOCUMENTS

| | | | | |
|---|---|---|---|---|
| 6,145,086 | A * | 11/2000 | Bellemore et al. | 726/18 |
| 6,408,306 | B1 * | 6/2002 | Byrne et al. | 1/1 |
| 7,032,026 | B1 * | 4/2006 | Biswas et al. | 709/229 |
| 7,165,182 | B2 | 1/2007 | Excoffier et al. | |
| 7,191,467 | B1 * | 3/2007 | Dujari et al. | 726/5 |
| 7,676,829 | B1 * | 3/2010 | Gui et al. | 726/5 |
| 7,865,842 | B2 * | 1/2011 | Forlenza et al. | 715/816 |
| 2002/0108046 | A1 * | 8/2002 | Armingaud | 713/183 |
| 2004/0059951 | A1 * | 3/2004 | Pinkas et al. | 713/202 |
| 2004/0093519 | A1 | 5/2004 | Grobman | |
| 2004/0123160 | A1 * | 6/2004 | Mizrah | 713/202 |
| 2004/0225899 | A1 * | 11/2004 | Mizrah | 713/202 |
| 2004/0250116 | A1 * | 12/2004 | Strickland et al. | 713/201 |
| 2005/0138426 | A1 * | 6/2005 | Styslinger | 713/201 |
| 2005/0144072 | A1 | 6/2005 | Perkowski et al. | |
| 2005/0289356 | A1 | 12/2005 | Shoham | |
| 2006/0021036 | A1 | 1/2006 | Chang et al. | |
| 2006/0036871 | A1 | 2/2006 | Champine et al. | |
| 2006/0041756 | A1 * | 2/2006 | Ashok et al. | 713/183 |
| 2006/0224897 | A1 | 10/2006 | Kikuchi et al. | |
| 2007/0277224 | A1 * | 11/2007 | Osborn et al. | 726/2 |
| 2008/0022372 | A1 * | 1/2008 | Zhang et al. | 726/4 |
| 2008/0066167 | A1 * | 3/2008 | Andri | 726/5 |
| 2008/0082832 | A1 * | 4/2008 | McDougal et al. | 713/183 |
| 2008/0163361 | A1 * | 7/2008 | Davis et al. | 726/19 |

OTHER PUBLICATIONS

Chakrabarti et al., "Password-Based Authentication: Preventing Dictionary Attacks", Computer, Jun. 2007, vol. 40 Issue:6; on pp. 68-74.*
De Ru et al., "Enhanced Password Authentication Through Fuzzy Logic", IEEE Expert, Intelligent Systems and their Applications, (Nov. / Dec. 1997).

* cited by examiner

*Primary Examiner* — Taghi Arani
*Assistant Examiner* — Morshed Mehedi
(74) *Attorney, Agent, or Firm* — Cuenot, Forsythe & Kim, LLC

(57) ABSTRACT

A method of managing network security can include receiving a user input comprising a user name and a password, determining whether the input user name potentially corresponds to a plurality of user accounts, determining whether the password is valid, and determining whether each of the user accounts is locked. The method can include selecting a security response to the user input based upon whether the input user name potentially corresponds to the plurality of user accounts, whether the password is valid, whether each of the user accounts is locked, and outputting the security response.

15 Claims, 2 Drawing Sheets

NETWORK SECURITY MANAGEMENT FOR AMBIGUOUS USER NAMES

FIELD OF THE INVENTION

The embodiments of the present invention relate to network security management, and more particularly, to implementing a network security system with account lockout when using ambiguous user names.

BACKGROUND OF THE INVENTION

Passwords and user identification names (user names) are commonly used in network security systems intended to determine the authenticity of a user accessing a secure account, system, application, device, or the like. These network security systems are often vulnerable to assailants circumventing the system via repeated guesses of the account password of a user. This approach has prompted the use of lockout schemes which lock the user out of an account following a predetermined number of incorrect login attempts. In such a scheme, each incorrect login attempt may result in a strike being applied to the account and application of a predetermined number of strikes can result in the account being locked from access. For example, the network security system may allow the user to enter an incorrect password three times, after which any further failed attempts will result in the account access being locked. Upon locking access to the account a correct user name and password will no longer grant access to the account, at least until such time as it is reset by a system manager.

In certain network security systems, an input user name need not be an exact match with a user name within a user account directory to gain account access. This approach allows the user name to be ambiguous, meaning the input user name contains some quantity of letters, numbers and/or symbols in common with at least two user names in the user directory, but need not be an exact match with either user name. For example, the user may input the user name Robert, which matches the user names Robert Davis, Robert Smith, and Robert Harris. As the example shows, the use of an ambiguous user name can result in multiple user names that match a particular input user name. As a result of these multiple matches, implementation of a lockout scheme can take on greater complexity.

BRIEF SUMMARY OF THE INVENTION

The embodiments disclosed herein relate to network security management for ambiguous user names. One embodiment of the present invention can include a method of managing network security. The method can include receiving a user input comprising a user name and a password, determining whether the input user name potentially corresponds to a plurality of user accounts, determining whether the password is valid, and determining whether each of the user accounts is locked. The method further can include, selecting a security response to the user input based upon whether the input user name potentially corresponds to the plurality of user accounts, whether the password is valid, whether each of the user accounts is locked, and outputting the security response.

Another embodiment of the present invention can include a system for network security management. The system can include a server that receives a user input comprising a user name and a password, determines whether the input user name potentially corresponds to a plurality of user accounts, determines whether the password is valid, and determines whether each of the user accounts is locked. The server further can select a security response to the user input based upon whether the input user name potentially corresponds to the plurality of user accounts, whether the password is valid, whether each of the user accounts is locked, and output the security response.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
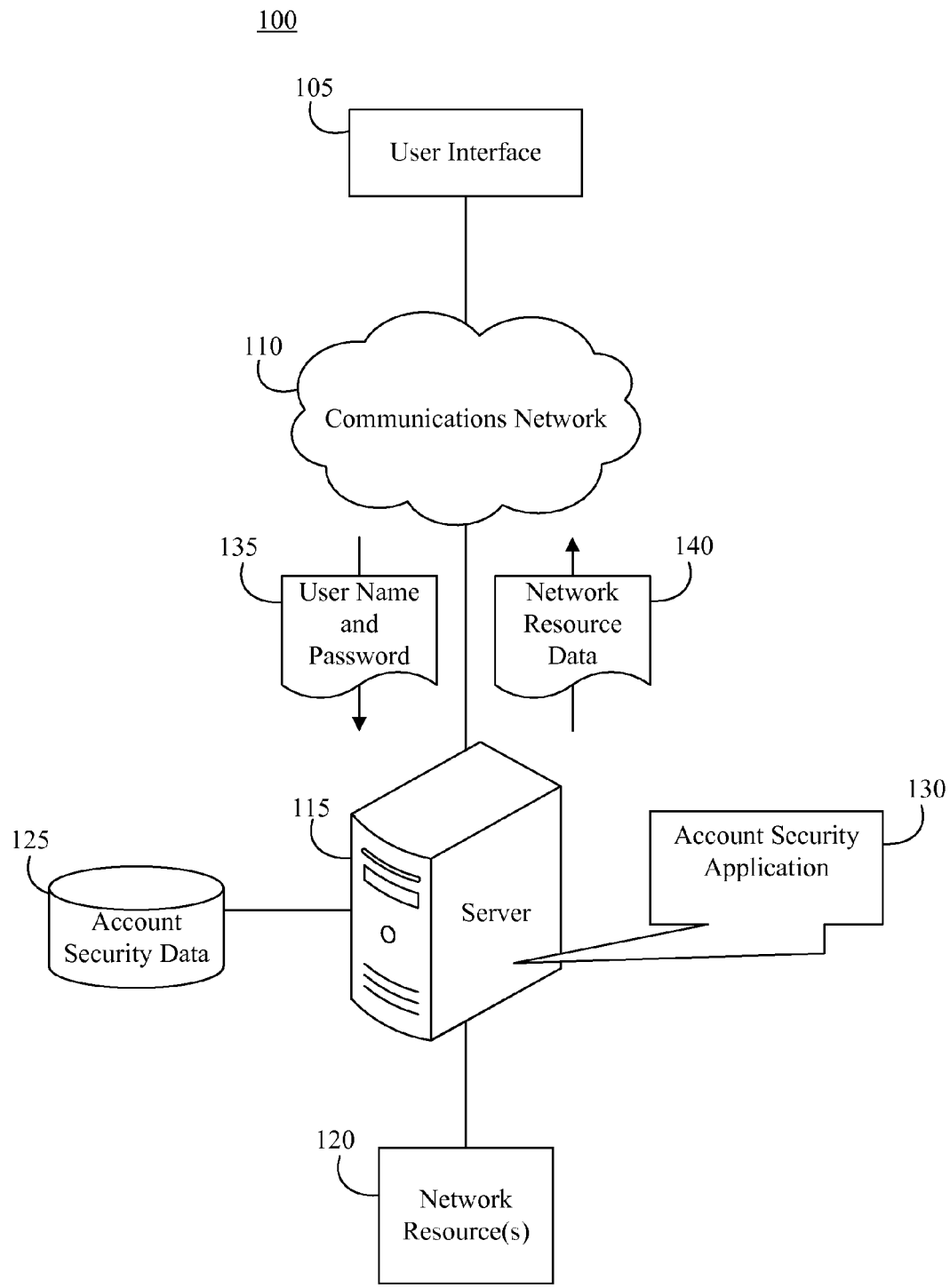
FIG. 1 is a block diagram illustrating a system for managing network security in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In accordance with the embodiments below a user can input a user name and a password to a user interface in an effort to access a user account on a network. Using a series of security guidelines, a network security response to the user input can be determined based upon whether the input user name corresponds to a plurality of user accounts, the validity of the password, and whether the user account to which the user requests access is locked. The guidelines can allow the implementation of a network security system that can support an account lockout feature. The inclusion of the account lockout feature to the network security system decreases the vulnerability of the network to outside intruders seeking to gain unauthorized access to the network. Thus lockout schemes increase the overall security of the network.

FIG. 1 is a block diagram illustrating a system 100 for managing network security in accordance with one embodiment of the present invention. The system 100 can include a user interface 105, a communications network 110, a server 115, a networks resource 120, account security data 125, and an account security application 130.

The user interface 105 can be any client based computing device capable of receiving inputs from a user and communicating such inputs to the communications network 110. The user interface 105 can also facilitate user interactions with the network resource 120. The user interface 105 can be implemented as, but is not limited to, a personal computer, a workstation, a wired or wireless handheld device, a touch screen device, a telephone, an entertainment or broadcast media device, an audio input transducer (e.g. microphone), an information kiosk, or any other device capable of providing the user access to a secured account or a network resource. For example, the user interface 105 can be a cellular telephone through which the user accesses an email account, a touch screen on an automatic teller machine for accesses a checking account, or an office computer through which an employee accesses a company intra-net site. Through the user interface 105, the user can input a user name and a password intended to access the secure account or the network resource via the communications network 110

The communications network 110, which may comprise a wide area network (WAN), such as the Internet, the World Wide Web, a dispatch communications network, an interconnect communications network (e.g. a cellular communications network), a public switched telephone network (PSTN), and the like. The communications network 110 also may comprise a local area network (LAN), a metropolitan area network (MAN), a WiFi network, a Mesh network, a public safety network (e.g. Astro, TETRA, HPD, etc) and/or any other networks or systems over which communication signals can be propagated. In that regard, the communications network 110 can include wired and/or wireless communication links. Further, the communications network 110 can be implemented in accordance with any suitable communications standards, protocols, and/or architectures, or a suitable combination of such standards, protocols, and/or architectures. Accordingly, the communications network 110 can facilitate communication by transferring a user name and password 135 and network resource data 140 between the user interface 105 and the server 115.

The server 115 can be any system or device that can perform server functions within the network architecture. For example, the server 115 can run server operating systems and server applications, as well as provide database access, file access, and remote access (e.g. via the communications network 110). The server 115 also can host general utility applications via the network connection 110. In addition, the server 115 can receive messages from the communications network 110 and process such messages. For example, the server 115 can initiate events in response to such messages, forward such messages to other nodes of the network, or perform any other suitable communication functions for the network. As such, the server 115 can comprise one or more processors/controllers, data storage devices, user interfaces, communication adapters, and/or other suitable components, such as those previously described.

The network resource 120 can comprise any number of databases, general applications, websites, communications or entertainment portals (e.g. the internet or intranet), electronic or voice mail, wired or wireless access ways (e.g. cellular phone service), or any other resource requiring user authentication. For example, a long distance service on a company phone system which requires the user name and the password to gain access, a secure personnel data base within the company, or a personal checking account on a banking website all may be referred to as "network resources."

The account security data 125 can include account security information necessary for determining user authentication to the network resource 120. The account security data 125 can include account user names, account passwords, a number of invalid account login attempts, and an access state of the account (e.g. locked or unlocked). The account security data can be employed by the account security application 130 to determine security responses.

The account security application 130 can process input security information (e.g. the user names and the passwords) received from the user interface 105 via the server 115 and determine an appropriate security response. The account security application 130 can apply a series of security guidelines based upon whether the input user name corresponds to a plurality of user accounts, the password is valid, and the user accounts corresponding to the input user name are locked. The account security application 130 can then output a security response to the network and update the account security data 125. For example, account security application 130 can receive the input user name from the server 115 and determine the input user name matches four user names found within the account security data 125. The accounts of the four user names may include two locked user accounts and two unlocked user accounts. The password may be determined to be valid for only one of the four matching user names. The account security application 130 then can determine that the correct security response to the user input is to allow access to the one user account for which the password is valid and deny access to all other user accounts. Once access is allowed, the account security application 130 may grant the user access to the user account or the network resource 120 via the server 115.

Figure 2:
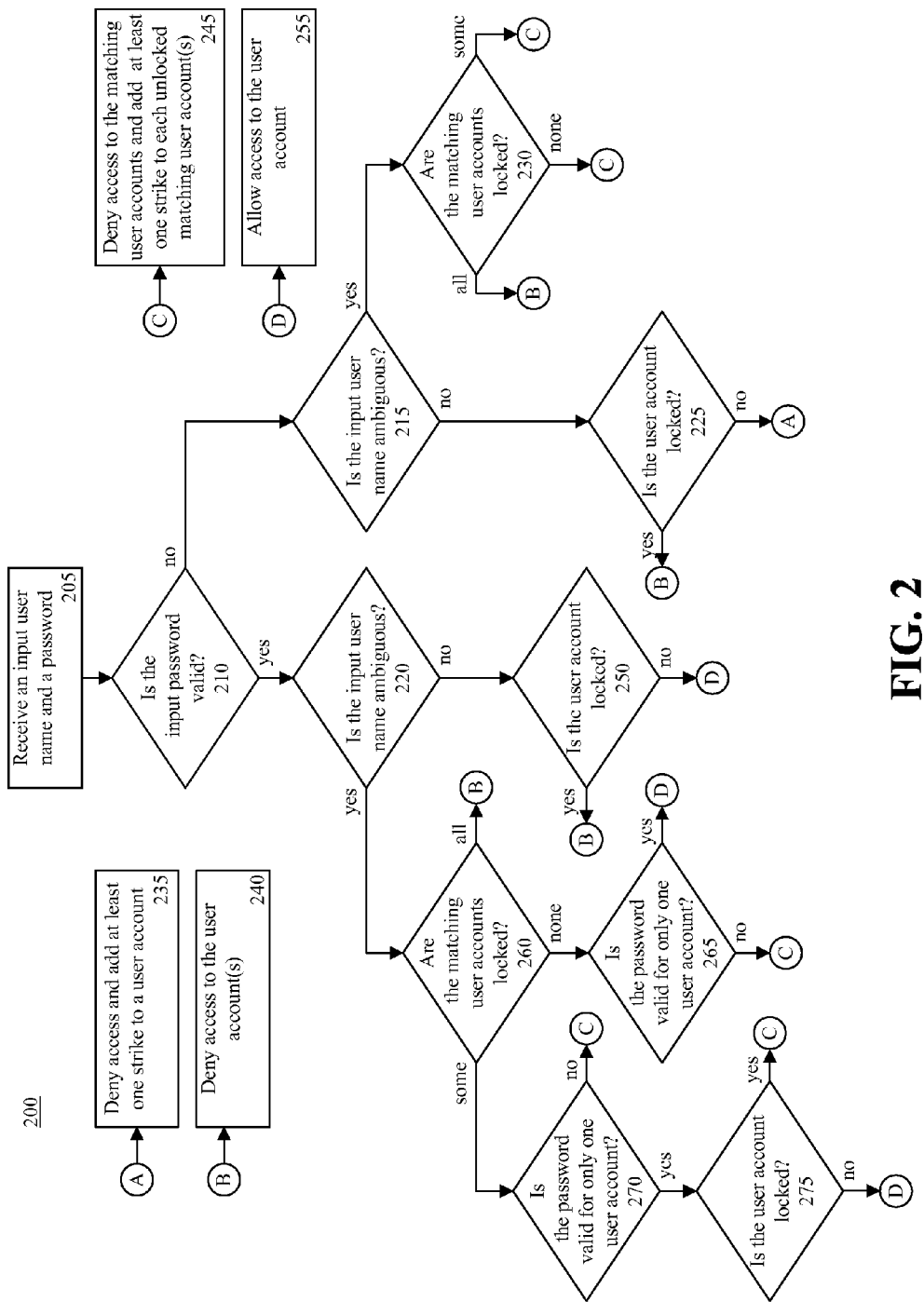
FIG. 2 is a flow chart illustrating a method of managing network security in accordance with another embodiment of the present invention.

FIG. 2 is a flow chart illustrating a method 200 of managing network security in accordance with another embodiment of the present invention. The method 200 can be implemented using the system described with reference to FIG. 1 or another system with the same or similar functionality. The method 200 can use a series of guidelines to determine a security response upon receiving a user input of a user name and a password. These guidelines are based upon whether the user name is ambiguous, the password is valid, and the user is currently locked from accessing a user account. As used herein, the phrase "ambiguous user name" means an input user name that corresponds to each user name associated with a plurality of user accounts. Each of the corresponding user names will share some common grouping of letters, numbers, or symbols with the input user name. For example, the input user name "John" may be ambiguous and match the user names John Smith, John Davis, and John Mills, all of which can be considered matching user names to the ambiguous user name "John." The term "matching user account", as used herein, means a plurality of user accounts associated with the user names that correspond to the input user name, or following the earlier example, the user accounts of John Smith, John Davis, and John Mills would be considered matching user accounts to the input user name John.

Also, the term "strike," as used herein, means a recording of an incorrect login attempt to the user account. For example, the user may input the valid unambiguous user name "John Doe" and the invalid password "airport," resulting in the incorrect login attempt. As a result of the incorrect login attempt, a strike may be added to the user account of John Doe. As described earlier, the accumulation of a predetermined number of strikes can lead to the user account being locked.

Beginning at step 205, the input user name and the password can be received. The user input can be communicated via a user interface. Referring to decision box 210, when the password is determined to be invalid, the method 200 can proceed to decision box 215. When the password is determined to be valid, the method 200 may proceed to decision box 220. At decision box 215, when the user name is determined to be unambiguous, the method 200 can proceed to decision box 225. At decision box 225, when the user account is unlocked, the method 200 can proceed to step 235 and the user may be denied access to the user account associated with the unambiguous user name, as well as at least one strike added to the user account. For example, when the user name "John Doe" and the password "airport" are input to the user interface, John Doe may be determined to be a unique user name, and therefore unambiguous. The password airport may be determined to be valid for the user account of John Doe, however it also may be determined that the user account of John Doe is unlocked. In this case, the user can be denied access to the user account of John Doe and at least one strike may be added to the user account.

Returning to decision box 225, when the user account is locked, the method 200 can proceed to step 240 and the user may be denied access to the user account associated with the unambiguous user name. For example, when the user name "John Doe" and the password "airport" are input to the user interface, John Doe may be determined to be a unique user name, and therefore unambiguous. Further, the password airport may be determined to be invalid for the user name John Doe. It also may be determined that the user account John Doe is locked. In this case, the user can be denied access to the user account of John Doe.

Returning to decision box 215, when the user name is ambiguous, the method 200 can proceed to decision box 230. At decision box 230, when all of the matching user accounts are locked, the method 200 can proceed to step 240 and the user may be denied access to the matching user account. For example, when the input user name is "John" and the password is "airport", it may be determined that the user names John Mint, John Doe, and Johnny, are a match to the input user name John. The password airport may be determined to be invalid for all of the matching user accounts. It also may be determined that all of the user accounts of John Mint, John Doe, and Johnny are locked. Therefore, access may be denied to the user accounts of John Mint, John Doe, and Johnny.

Returning to decision box 230, when none or some of the matching user account are locked, the method 200 can proceed to step 245. At step 245, access can be denied to the matching user accounts and at least one strike can be added to the unlocked matching user accounts. Using the earlier example, when the input user name is "John" and the password is "airport", it may be determined that the user names John Mint, John Doe, and Johnny are a match to the input user name John. Further, the password airport may be determined to be invalid for all of the matching user accounts. It also can be determined that all matching user accounts are unlocked or that some matching user accounts are unlocked. In the case of all of the user accounts being unlocked and the case of some of the user accounts being unlocked, user access can be denied to the user accounts of John Mint, John Doe, and Johnny. When all of the matching user accounts are unlocked then at least one strike may be added to each of the user accounts of John Mint, John Doe, and Johnny. When only some of the user accounts are unlocked, for example only the user account of John Doe is unlocked, then the user account of John Doe can have at least one strike added and the locked user accounts of John Mint and Johnny can be left unchanged.

Returning to decision box 210, when the password is determined to be valid, the method 200 can proceed to decision box 220. At decision box 220, when the user name is determined to be unambiguous, the method 200 can proceed to decision box 250. When the user name is ambiguous, the method 200 may proceed to decision box 260. At decision box 250, when the user account is locked, the method 200 can proceed to step 240 and the user may be denied access to the user account. As an example, when the user name "John Doe" and the password "airport" are input to the user interface, John Doe may be determined to be a unique user name, and therefore unambiguous. The password airport may be determined to be valid for the user account of John Doe, however it also may be determined that the user account of John Doe is locked. In this case, the user may be denied access to the user account of John Doe.

Returning to decision box 250, when the user account is unlocked, the method 200 can proceed to step 255 and user access can be allowed to the user account. For example, when the user name "John Doe" and the password "airport" are input to the user interface, John Doe may be determined to be a unique user name, and therefore unambiguous. The password airport may be determined to be valid for the user account John Doe. It also may be determined that the user account of John Doe is unlocked. In this case, the user can be allowed access to the user account of John Doe.

Returning to decision box 260, when all of the matching user accounts are locked, the method 200 can proceed to step 240 and deny access to the matching user accounts. In this example, when the input user name is "John" and the password is "airport", it may be determined that all of the user names John Mint, John Doe, and Johnny are a match to the input user name "John". Further, the password airport may be determined to be valid for at least one of the matching user accounts. It also may be determined that the matching user accounts of John Mint, John Doe, and Johnny are locked. In this case, the user may be denied access to the user accounts of John Mint, John Doe, and Johnny.

Returning to decision box 260, when none of the matching user accounts are locked, the method 200 proceeds to decision box 265. At decision box 265, when the password is valid for only one of the matching user accounts, the method 200 can proceed to step 255 and may allow the user access to the user account for which the password is valid. For example, when the input user name is "John" and the password is "airport", it may be determined that the user names John Mint, John Doe, and Johnny, are a match to the input user name John. The password airport may be determined to be valid only for the user account of John Doe. It also may be determined that none of the user accounts of John Mint, John Doe, and Johnny are locked. In this case, the user can be allowed access to the user account of John Doe.

Returning to decision box 265, when the password is valid not only for one of the matching user accounts, the method 200 can proceed to step 245 and may deny the user access to the matching user accounts, as well as add at least one strike to the unlocked matching user accounts. It should be noted that since there are matching user name and password combinations for this case, the addition of strikes to the user accounts can be optional. For example, when the input user name is "John" and the password is "airport", it may be determined that the user names John Mint, John Doe, and Johnny, are a match to the input user name John. The password airport may be determined to be valid not only for one of the matching user account, however it also may be determined that the matching user accounts of John Mint, John Doe and Johnny are locked. In this case, the user can be denied access to the user accounts of John Mint, John Doe and Johnny, and at least one strike added to each user account.

Returning to decision box 260, when some of the matching user accounts are locked, the method 200 proceeds to decision box 270. At decision box 270, when it is determined the password is valid not only for one matching user account, the method can proceed to step 245 and deny access to the matching user accounts, as well as add at least one strike to the unlocked matching user accounts. It should be noted that since there are matching user name and password combinations for this case, the addition of strikes to the user accounts can be optional. In this example, when the input user name is "John" and the password is "airport", it may be determined that the user names John Mint, John Doe, and Johnny, are a match to the input user name "John". The password "airport" may be determined to be valid not only for one matching user account, though it also may be determined that at least one of the matching user accounts is locked (e.g. John Doe) and at least one of the matching user accounts is unlocked (e.g. John Mint and Johnny). In this case, the user can be denied access to the user accounts of John Mint, John Doe, and Johnny and at least one strike added to each of the user accounts of John Mint, and Johnny.

Returning decision box 270, when password is valid for only one matching user account the method 200 can proceed to decision box 275. At decision box 275, when the user account for which the password is valid is locked, the method 200 can proceed to step 245 and can deny access to the matching user accounts, as well as add at least one strike to the unlocked matching user accounts. In this example, when the input user name is "John" and the password is "airport", the user names John Mint, John Doe, and Johnny can be determined to match the input user name John. Further the password airport may be determined to be valid for only one matching user account and that the user account is locked (e.g. John Doe). It also may be determined that at least one of the matching user accounts is locked (e.g. John Doe) and at least one of the matching user accounts is unlocked (e.g. John Mint and Johnny). In this case, the user can be denied access to the user accounts of John Mint, John Doe, and Johnny, and at least one strike added to the user accounts of John Mint and Johnny.

At decision box 275, when the user account for which the password is valid is unlocked, the method 200 can proceed to step 255 and may allow access to the user account with the valid password. In this example, when the input user name is "John" and the password is "airport", it may be determined that the user names John Mint, John Doe, and Johnny are a match to the input user name John. Further, the password airport may be determined to be valid for only one matching user account and that the user account is unlocked (e.g. John Mint). It also may be determined that at least one of the matching user accounts is locked (e.g. John Doe) and at least one of the matching user accounts is unlocked (e.g. John Mint and Johnny). In this case, the user can be allowed access to the user account of John Mint.

Mention should be made that steps 235-245 and step 255, each represent the security response of the method 200 to each of the security conditions (i.e. user inputs and user account histories) covered in FIG. 2. Further, an output of these security responses can be inferred within steps 235-245 and step 255. For example, the method 200 can deny access to the user and output this access denial to the server, or output to an account directory when adding at least one strike to the user account.

As used herein, "output" or "outputting" can include, but is not limited to, writing to a file, writing to a user display or other output device, playing audible notifications, sending or transmitting to another system, exporting, or the like.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of managing network security comprising:
   receiving a user input from a user comprising a user name and a password;
   determining whether the user name corresponds to a plurality of user accounts;
   determining whether the password is valid;
   respectively determining whether each of the plurality of user accounts is locked;
   selecting a security response to the user input based upon whether the user name corresponds to the plurality of user accounts, whether the password is valid, and whether each of the plurality of user accounts is locked,
   wherein selecting the security response to the user input further comprises denying access to the user to the plurality of user accounts and adding at least one strike to each of the plurality of user accounts that are unlocked in response to determining that the user name corresponds to a user name associated with each of the plurality of user accounts, determining that the password is invalid for at least one of the plurality of user accounts, and determining that at least a first of the plurality of user accounts is unlocked,
   wherein a predetermined number of strikes leads to an account being locked; and
   outputting the security response.

2. A computer-implemented method of managing network security comprising:
   receiving a user input from a user comprising a user name and a password;
   determining whether the user name corresponds to a plurality of user accounts;
   determining whether the password is valid;
   respectively determining whether each of the plurality of user accounts is locked;
   selecting a security response to the user input based upon whether the user name corresponds to the plurality of user accounts, whether the password is valid, and determining whether each of the plurality of user accounts is locked,
   wherein selecting the security response to the user input further comprises denying access to the user to the plurality of user accounts and adding at least one strike to each of the plurality of user accounts that are unlocked in response to determining that the user name corresponds to a user name associated with each of the plurality of user accounts, determining that the password either is valid or invalid for at least one of the plurality of user accounts, and determining that at least a first of the plurality of user accounts is locked,
   wherein a predetermined number of strikes leads to at least a second of the plurality of user accounts being locked; and
   outputting the security response.

3. The computer-implemented method of claim 1, wherein selecting the security response to the user input further comprises:

determining that at least a second of the plurality of user accounts is locked.

4. A computer-implemented method of managing network security comprising:
   receiving a user input from a user comprising a user name and a password;
   determining whether the user name corresponds to a plurality of user accounts;
   determining whether the password is valid;
   respectively determining whether each of the plurality of user accounts is locked;
   selecting a security response to the user input based upon whether the user name corresponds to the plurality of user accounts, whether the password is valid, and determining whether each of the plurality of user accounts is locked,
   wherein selecting the security response to the user input further comprises allowing access to the user to the plurality of user accounts that are unlocked in response to determining that the user name corresponds to a user name associated with each of the plurality of user accounts, and
   determining that the password is valid for at least a first of the unlocked of user accounts; and
   outputting the security response.

5. The computer-implemented method of claim 4, wherein selecting the security response to the user input further comprises:
   determining that the password is invalid for at least a second of the plurality of user accounts.

6. A network security management system comprising:
   a server comprising at least one processor and at least one memory element, the server operable to:
   via the processor, receive a user input comprising a user name and a password;
   via the processor, determine whether the user name corresponds to a plurality of user accounts;
   via the processor, determine whether the password is valid;
   via the processor, respectively determine whether each of the plurality of user accounts is locked;
   via the processor, select a security response to the user input based upon whether the user name corresponds to the plurality of user accounts, whether the password is valid, and whether each of the user accounts is locked,
   wherein selecting the security response to the user input further comprises denying access to the user to the plurality of user accounts and adding at least one strike to each of the plurality of user accounts that are unlocked in response to determining that the user name corresponds to a user name associated with each of the plurality of user accounts, determining that the password is invalid for at least one of the plurality of user accounts, and determining that at least a first of the plurality of user accounts is unlocked,
   wherein a predetermined number of strikes leads to an account being locked; and
   via the processor, output the security response.

7. A computer program product comprising:
   a computer-readable storage device having stored thereon computer-usable program code that, when executed by a system comprising a processor and a memory, manages network security, the computer-readable storage device comprising:
   computer-usable program code that receives a user input comprising a user name and a password;
   computer-usable program code that determines whether the user name corresponds to a plurality of user accounts;
   computer-usable program code that determines whether the password is valid;
   computer-usable program code that respectively determines whether each of the plurality of user accounts is locked;
   computer-usable program code that selects a security response to the user input based upon whether the user name corresponds to the plurality of user accounts, whether the password is valid, and whether each of the user accounts is locked,
   wherein selecting the security response to the user input further comprises denying access to the user to the plurality of user accounts and adding at least one strike to each of the plurality of user accounts that are unlocked in response to determining that the user name corresponds to a user name associated with each of the plurality of user accounts, determining that the password is invalid for at least one of the plurality of user accounts, and determining that at least a first of the plurality of user accounts is unlocked,
   wherein a predetermined number of strikes leads to an account being locked; and
   computer-usable program code that outputs the security response.

8. The network security management system of claim 6, further comprising:
   determining that at least a second of the plurality of user accounts is locked.

9. A network security management system comprising:
   a server comprising at least one processor and at least one memory element, the server operable to:
   via the processor, receive a user input comprising a user name and a password;
   via the processor, determine whether the user name corresponds to a plurality of user accounts;
   via the processor, determine whether the password is valid;
   via the processor, respectively determine whether each of the plurality of user accounts is locked;
   via the processor, select a security response to the user input based upon whether the user name corresponds to the plurality of user accounts, whether the password is valid, and whether each of the plurality of user accounts is locked, wherein selecting the security response to the user input further comprises denying access to the user to the plurality of user accounts and adding at least one strike to each of the plurality of user accounts that are unlocked in response to determining that the user name corresponds to a user name associated with each of the plurality of user accounts, determining that the password either is valid or invalid for at least one of the plurality of user accounts, and determining that at least a first of the plurality of user accounts is locked,
   wherein a predetermined number of strikes leads to at least a second of the plurality of user accounts being locked; and
   via the processor, output the security response.

10. A network security management system comprising:
    a server comprising at least one processor and at least one memory element, the server operable to:
    via the processor, receive a user input comprising a user name and a password;
    via the processor, determine whether the user name corresponds to a plurality of user accounts;
    via the processor, determine whether the password is valid;

via the processor, respectively determine whether each of the plurality of user accounts is locked;

via the processor, select a security response to the user input based upon whether the user name corresponds to the plurality of user accounts, whether the password is valid, and whether each of the user accounts is locked, wherein selecting the security response to the user input further comprises allowing access to the user to the plurality of user accounts that are unlocked in response to determining that the user name corresponds to a user name associated with each of the plurality of user accounts, determining that the password is valid for at least a first of the plurality of user accounts; and via the processor, output the security response.

11. The network security management system of claim 10, further comprising:

determining that the password is invalid for at least a second of the plurality of user accounts is locked.

12. The computer program product of claim 7, further comprising:

determining that at least a second of the plurality of user accounts is locked.

13. A computer program product comprising:

a computer-readable storage device having stored thereon computer-usable program code that, when executed by a system comprising a processor and a memory, manages network security, the computer-readable storage device comprising:

computer-usable program code that receives a user input comprising a user name and a password;

computer-usable program code that determines whether the user name corresponds to a plurality of user accounts;

computer-usable program code that determines whether the password is valid;

computer-usable program code that respectively determines whether each of the plurality of user accounts is locked;

computer-usable program code that selects a security response to the user input based upon whether the user name corresponds to the plurality of user accounts, whether the password is valid, and whether each of the user accounts is locked, wherein selecting the security response to the user input further comprises denying access to the user to the plurality of user accounts and adding at least one strike to each of the plurality of user accounts that are unlocked in response to determining that the user name corresponds to a user name associated with each of the plurality of user accounts, determining that the password either is valid or invalid for at least one of the plurality of user accounts, and determining that at least a first of the plurality of user accounts is locked, wherein a predetermined number of strikes leads to at least a second of the plurality of user accounts being locked; and computer-usable program code that outputs the security response.

14. A computer program product comprising:

a computer-readable storage device having stored thereon computer-usable program code that, when executed by a system comprising a processor and a memory, manages network security, the computer-readable storage device comprising:

computer-usable program code that receives a user input comprising a user name and a password;

computer-usable program code that determines whether the user name corresponds to a plurality of user accounts;

computer-usable program code that determines whether the password is valid;

computer-usable program code that respectively determines whether each of the of the plurality of user accounts is locked;

computer-usable program code that selects a security response to the user input based upon whether the user name corresponds to the plurality of user accounts, whether the password is valid, and whether each of the user accounts is locked, wherein selecting the security response to the user input further comprises allowing access to the user to the plurality of user accounts that are unlocked in response to determining that the user name corresponds to a user name associated with each of the plurality of user accounts, determining that the password is valid for at least a first of the plurality of user accounts; and via the processor, output the security response.

15. The computer program product of claim 14, further comprising:

determining that the password is invalid for at least a second of the plurality of user accounts is locked.

* * * * *